May 22, 1951 M. C. K. DE PORAY 2,554,092
APPARATUS FOR HEATING A FLUID
BY MEANS OF SOLID FUEL
Filed Sept. 18, 1945 2 Sheets-Sheet 1
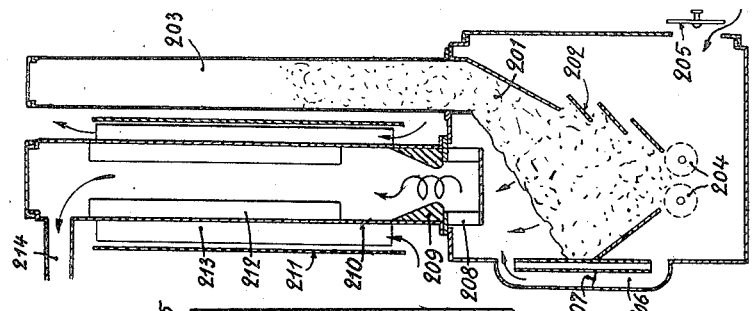
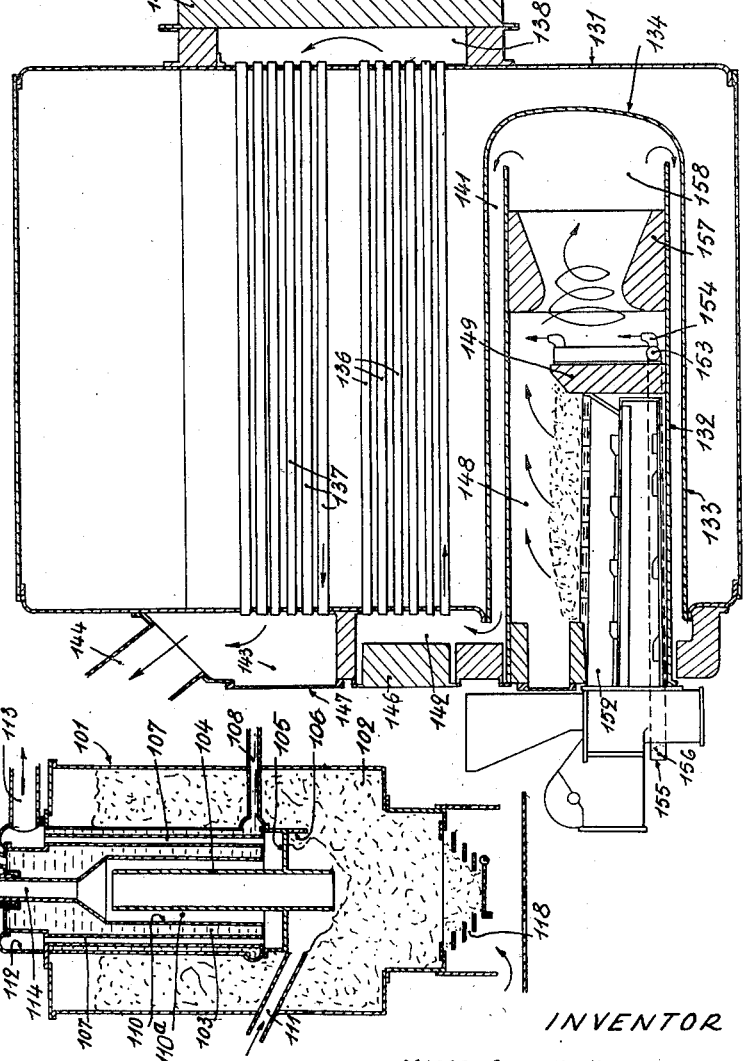
INVENTOR
MARCEL CYPRIEN KUCZEWSKI de PORAY
BY
HIS ATTY

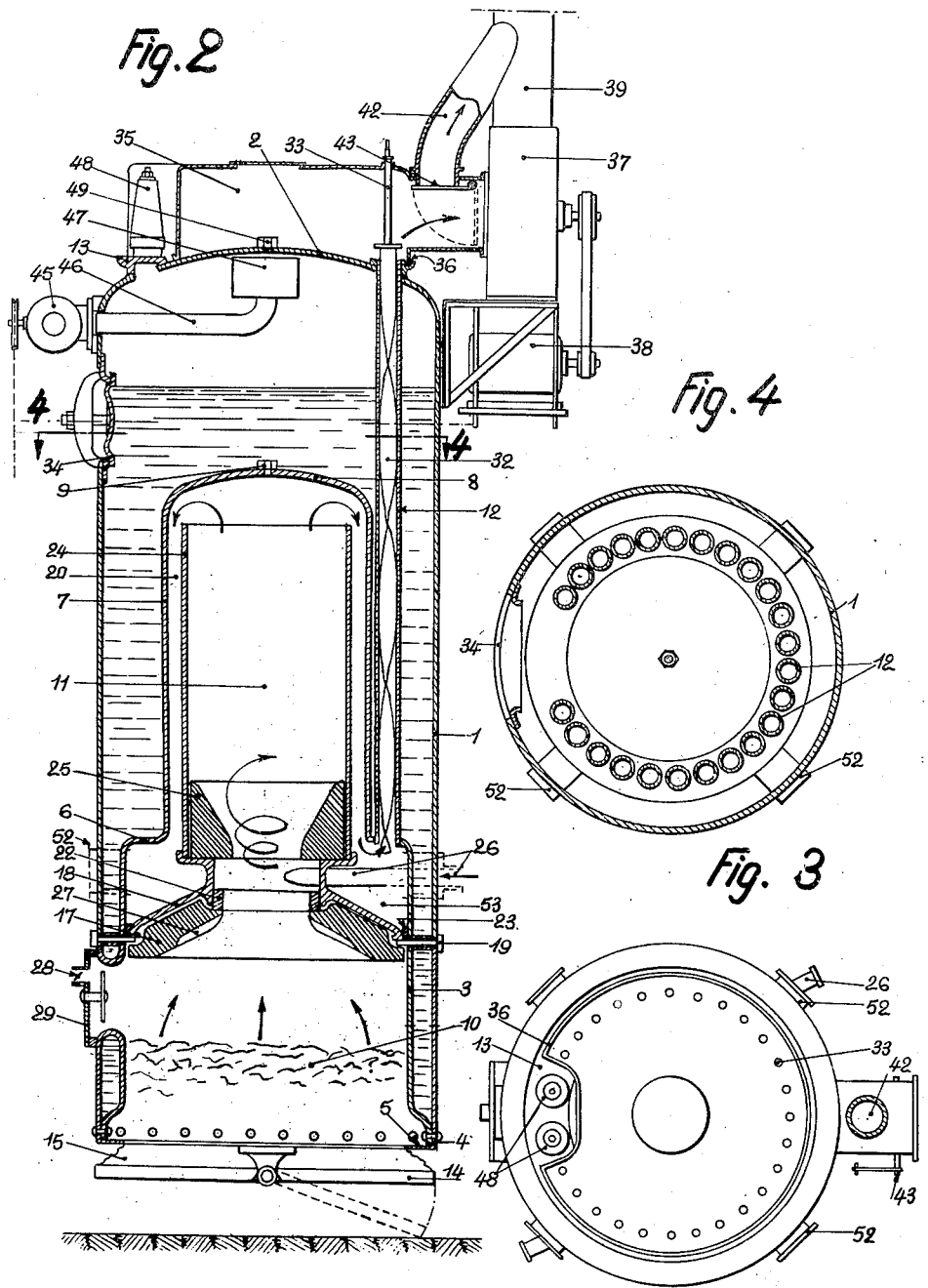

Patented May 22, 1951

2,554,092

UNITED STATES PATENT OFFICE 2,554,092

APPARATUS FOR HEATING A FLUID BY MEANS OF SOLID FUEL

Marcel Cyprien Kuczewski de Poray, Rodez (Aveyron), France

Application September 18, 1945, Serial No. 617,118
In France April 29, 1941

3 Claims. (Cl. 122—182)

The object of this invention is to devise an apparatus for heating a fluid by means of solid fuel.

According to one feature of the invention, the device comprises a tubular hearth in which part a total combustion of the gaseous elements evolved from the fuel takes place by means of a secondary draught entry, one or several elements transferring heat to the heated fluid being arranged around said tubular hearth, whose entrance opens into a fuel containing tank, in which an inrush of primary draught ensures combustion under such conditions that the resulting gaseous compounds still retain a certain amount of combustible gases as they enter the tubular hearth, discharge from which is effected into the whole group of heat transmitting elements. Combustion of the gases is completed in the tubular hearth, as will hereinafter appear.

According to another feature of the invention, a spinning motion is imparted to the gases by means of devices such as tangential tuyères or blades, helicoidal inclines, and so forth, fitted on the tubular hearth or at the entry thereof.

Further features of the invention will become apparent from the following description, referring to the accompanying drawings which show by way of example different embodiments of the invention and in which:

Fig. 1 diagrammatically shows in vertical section, the theoretical arrangement of an apparatus according to the invention.

Fig. 2 is a vertical section through the practical embodiment of a vertical boiler according to the invention.

Fig. 3 is a corresponding plan view.

Fig. 4 is a horizontal sectional view through line 4—4 of Fig. 2.

Fig. 5 is a vertical section through a practical embodiment of a horizontal boiler according to the invention, and Fig. 6 is a vertical section of a hot-air stove according to the invention.

Referring to Fig. 1, 101 is a main body containing fuel 102 and whose central portion contains an annular chamber 103 inside which a tubular hearth 104 is arranged, a space 110a being provided between the tubular hearth and the walls 110 of said chamber. Said tubular hearth is assembled to the base of the annular chamber by means of a head-plate 105 through which the tubular hearth is run so as to form an annular pre-combustion chamber 106. A conduit 111 opens into chamber 106. A group of tubular flues 107 opens into a smoke-box 112 connected to a stack (not shown) through a pipe 113.

A pipe 114 permits the discharge of tubular-hearth 104 to directly communicate with the stack by means of a pipe 115 comprising a damper 116.

At the base of the apparatus a grate with steps 118 is shown by way of example, through which the primary draught is admitted.

The apparatus functions as follows:

The primary draught coming in under the grate participates in the combustion of the fuel, it causes the furnace to act wholly or partly as a gas-producer, i. e. to produce a certain quantity of combustible gases. The combustion of these gases, more particularly that of the products of distillation starts in the pre-combustion chamber 106 and is carried on in the tubular hearth 104. The secondary draught required for this combustion is admitted through conduit 111 which will preferably open tangentially into the pre-combustion chamber 106 where the mixing of the gases with air takes place.

The gases in tubular hearth 104 are then discharged and flow downwards, into annular chamber 110a then upwards into tubes 107, smoke-box 112 and out through pipe 113.

Cold water is let in by pipe 108, rises through the annular chamber 103 and flows out heated, through pipe 109.

By opening damper 116, at starting or in other special cases, it is possible to convey directly from tubular hearth 104 to the stack, unconsumed or over-cool gases, and thus avoid sooting of the boiler.

The primary hearth 10 providing only an incomplete combustion, there will be no objection to lowering its temperature to avoid the production of slag. This result may be achieved, for example, by mixing the primary air with smoke or steam.

It can be seen that this type of boiler can be be readily used with pulverized fuel, the grate 118 being removed and the mixture of air and fuel-dust being injected into chamber 106 which acts as a pre-combustion chamber.

A description of an apparatus constructed according to the principles of this invention is given below and two examples of practical embodiments of the invention follow.

Referring to Figures 2, 3 and 4, representing a type of vertical steam boiler built according to the principle described above, in Fig. 2, 1 is the boiler body ending in a domed head-plate 2. The heating surfaces comprise a flue 3 connected to body 1 by a row of rivets 4, a casing or heat-transferring element 7 ending in a domed head plate 8, and smoke tubes 12. These are mounted on a lower tubular head-plate 6 and a cast-steel crown 13 welded to domed head-plate 2 so as to ensure proper caulking in spite of the domed head plate's incline.

Primary hearth 10 is hand fired onto a grate 14 consisting in two sections which may be tilted to permit a ready cleaning of the hearth; cleaning is also facilitated by a clearance space 15 provided between the grate and the boiler. The body 1 comprises, at its lower end, an annular plate 5 projecting towards the inside of the primary hearth 10.

Above the primary hearth is a refractory vault 17 suspended from fire-crown 18 which also supports the secondary hearth consisting in a tubular body 24 whose entry is fitted with a diffuser 25 out of refractory material, presenting a reduced sectional area to the flow of gases.

Two tangential tuyères 26, Figures 2 and 3, with adjustable sections and an additional inlet 28, Figure 2, are provided on the firedoor 29 to provide an entry for secondary air. Tangential inclines 27, cast in the same piece with the vault, are provided to give the gases a spinning motion which is still further increased by the kinetic effect of the draught tangentially admitted through tuyères 26.

The fire-crown 18 is supported by movable jacks 19 and its gas tightness secured by a gasket 23.

Smoke-tubes 12 contain sweeping-elements consisting in blades 32 connected to controlling rods 33 accessible from outside and allowing for said elements to be subjected to a rotary and a sliding movement even during service.

A manhole 34 placed opposite a free space provided in the tube nest permits access to the center of the boiler.

At the upper part of the boiler, is a smoke-box 35 and a smoke-suction-fan 37 driven by a motor 38. The flow of smoke may be adjusted by means of a damper 43: in service, through the fan, or, when the latter is stopped, through a by-pass 42 leading directly into the funnel.

The boiler also comprises safety-valves 48 and a steam exhaust 45 supplied with a water-trap 47. Doors 52 running through the water-space allow of access to chamber 53.

The above-described boiler operates as follows:

The part played by primary hearth 10 is not to ensure total combustion, but merely the transformation of the fuel into gaseous compounds of indifferent quality, whose combustion is adequately completed in the secondary hearth 11 next to the former. This primary hearth may therefore operate with a thick layer of fuel.

Crown 5 forms an annular chamber within which a ring of stagnant ash is produced. This arrangement achieves the purpose, first, of protecting the row of rivets 4, second, of creating in the gas-discharge a loss of head along the wall which results in a more uniform distribution of combustion over the total section of the hearth.

The gases discharging from the primary hearth are mixed with the secondary draught and a spin is imparted to this mixture, first, through the surface effect of the tangential inclines 27, second through the kinetic effect of the secondary draught entering tangentially through tuyères 26.

The air required for secondary combustion may be provided with the excess air from the primary hearth, by the draught entering through tuyères 26 and by the air let in through additional inlet 28. In certain cases of service, for instance in the event of a thin layer of fuel or of a dry-burning fuel, the required amount of secondary air may be very small, and consist entirely of the excess air through the primary hearth.

The spinning mixture of combustion gases then passes through the diffuser 25 where the combustion reactions are accelerated due to its reduced sectional area and the very high temperature of its walls.

Lastly, the gases reach the tubular-hearth 24 where, due to the high temperature of its walls, secondary combustion is completed under satisfactory conditions.

Moreover, the high temperature of the tubular hearth's walls ensures a high transfer of radiant heat onto the heating surface (casing or heat transferring element 7) which encircles it.

This heat radiation onto a cold surface results at the same time in limiting the tubular hearth's temperature to a value consistent with satisfactory maintenance.

The combustion gases discharged from tubular hearth 24 flow through annular chamber 20, between the tubular hearth and the casing 7 whose total thermal transmission coefficient, due to radiation from tubular hearth 24 and to convection by the gases, is thus comparatively high.

The gases enter chamber 53, then flow through smoke-tubes 12, smoke-box 35, and are sucked by fan 37 which then drives them to stack 39.

The smoke-tubes may be swept during service by operating from the outside rods 33 controlling sweeping elements 32.

Heat production may be adjusted by operating damper 43.

Fig. 5 represents by way of example a horizontal boiler carried out according to the invention.

Referring to this figure, 131 is the boiler drum, supplied at its lower portion with a tubular hearth 132 arranged inside at horizontal flue 133 closed at its rear end by a domed head-plate 134; a space 141 is provided between the tubular hearth and the flue to allow for the free circulation of the hot gases. Above flue 133 two smoke-tube nests 136 and 137 are arranged, opening at the back into a chamber 138. Tube nest 136 opens in front into a chamber 142 and tube nest 137 into a chamber 143, from which a pipe 144 leads off for the discharge of the gases.

Chambers 138, 142 and 143 comprise doors 145, 146 and 147 respectively, permitting access.

Tubular hearth 132 which is made out of cast iron or stainless steel comprises in front, primary hearth 148 ending in a fore-hearth 149 and shown equipped with an automatic stoker 152.

The rear portion of the tubular-hearth comprises the secondary hearth consisting in a secondary draught distributor, a diffuser and a combustion-chamber. The secondary draught distributor 153 comprises nozzles 154 directed approximately according to a tangent to the tubular hearth. Feed of this distributor is secured by a piping 155 carrying an adjusting device 156. Diffuser 157 is made out of refractory material and offers a reduced cross-sectional area to the flow of gases. The combustion chamber of the secondary hearth is formed by space 158 placed at the discharge of diffuser 157.

This boiler operates in a manner similar to the one previously described.

Water is poured into the boiler's drum, and flue 133 as well as both tube nests 136 and 137 are immersed.

The gases produced in primary hearth 148 are mixed with the secondary air which imparts to them a spinning motion together with a violent mixing-effect and they are completely consumed in secondary hearth 158. The consumed gases having been discharged from the tubular hearth circulate in the annular space 141, reach chamber 142, flow through the tube nests 136 and 137 towards the boiler's face and pass into smoke box 143, whence they are evacuated through pipe 144 into the stack or into an economizer or air-heater, if need be with the help of a fan or other induced draught device.

Ratio of $CO_2$ in the consumed gases is kept at a suitable value by means of an adjusting device 156.

The spin imparted to the gases at the entry of the secondary hearth can be amplified by means of tangential or helicoidal walls or inclines made out of refractory material and arranged on the fore-hearth 149 or the diffuser 157.

The apparatus according to the invention could likewise be arranged for the heating of a gaseous fluid and, in that event, for use as an air-stove. An example of this is typified in Fig. 6 in which primary hearth 201 is shown supplied with a grate with steps 202 automatically fed by gravity with fuel from a feeder 203 and comprising an ash-removing device 204.

According to the heat output desired, an adjustable valve 205 distributes the total amount of air required for combustion and consisting of primary air coming through the grate and secondary air which is let in above the primary hearth through a channel 206. An adjusting device 207 ensures a suitable proportion of secondary air according to the type of fuel employed. By means of this arrangement, it is possible, automatically and at all outputs, to maintain approximately constant the ratio of secondary draught and consequently to maintain the $CO_2$ ratio in the smoke at a suitable value.

This results from the fact that by said means, the ratio of loss of head and consequently of the flow of primary air through the fuel layer to the flow of secondary air through adjusting device 207 is kept appreciably constant, and that is true whatever may be the degree to which valve 205 is opened.

The secondary hearth consists of:

Mixer 208, out of refractory cast iron, comprising tangential blades imparting a spinning motion to the mixture of secondary air and gases from the primary hearth.

Diffuser 209, out of refractory material, whose reduced sectional area and walls at very high temperature contribute to the satisfactory evolution of the combustion reactions.

The tubular hearth 210, in which the combustion reactions are completed and whose walls which are at a very high temperature radiate heat onto the encircling heating-surface.

This heating-surface, constituted by flue 211, receives the heat radiated by the tubular hearth and transmits it to the air circulating along its inner and outer surfaces.

The extended tubular hearth comprises cooling fins 212 on its inner surface and cooling fins 213 on its outer surface, by means of which the gases are more readily stripped of their heat content. The gases are discharged directly through a nozzle 214.

The neighbouring air is heated by circulation between the tubular hearth 210 and the flue 211 and around this flue.

The invention is of course not restricted to the types of embodiment herein described and represented, which have been given solely by way of example. This apparatus can be applied to any heating appliance beside those mentioned above, including stoves, furnaces, drying ovens, etc.

Having now described my invention, what I claim as new and desire to secure by Letters Patent is:

1. A heating apparatus comprising a cylindrical outer body adapted to contain a fluid to be heated, a primary hearth, a metallic tubular hearth within said outer body and through which combustible gaseous compounds evolving from said primary hearth are adapted to flow and to be completely burnt, a diffuser of refractory material disposed between said primary hearth and said tubular hearth, said diffuser having tangential inclines thereon for imparting to said gaseous compounds a rotary motion, and nozzles opening tangentially within the wall of said diffuser for introducing secondary air of combustion into said tubular hearth, a chamber surrounding said tubular hearth and through which chamber the gases evolving from said tubular hearth are adapted to flow, and a heat transferring element directly subjected to the heat radiation from said metallic tubular hearth, said element being in contact with the fluid to be heated.

2. A heating apparatus comprising a cylindrical outer body adapted to contain the fluid to be heated, a primary hearth, means for introducing into said primary hearth primary air to support incomplete combustion, a metallic tubular hearth within said outer body and through which tubular hearth combustible gaseous compounds evolving from said primary hearth are adapted to flow and to be completely burned, a diffuser of refractory material disposed between said primary hearth and said tubular hearth, said diffuser lying within said tubular hearth, tuyères disposed immediately below said diffuser and directing secondary air tangentially into the gas flowing from the primary hearth to the diffuser, a chamber surrounding said tubular hearth and through which the gases evolving from said tubular hearth are adapted to flow, said chamber lying in direct heat transfer contact with said tubular hearth, and a heat transferring element enclosing the top and side wall of said tubular hearth and being directly subjected to the heat radiation from said metallic tubular hearth, said element being in contact with the fluid to be heated, said heat transferring element forming one wall of said chamber.

3. A heating apparatus as claimed in claim 2 in which a refractory vault is disposed below said diffuser in close proximity thereto, said vault having tangential inclines directing the flow of gases into said diffuser, said tuyères being disposed between said vault and said diffuser.

MARCEL CYPRIEN
KUCZEWSKI DE PORAY.

REFERENCES CITED

The following references are of record in the file of this patent:

UNITED STATES PATENTS

| Number | Name | Date |
|---|---|---|
| 32,731 | Willett | July 2, 1861 |
| 568,167 | Morgan | Sept. 22, 1896 |
| 1,029,998 | Benjamins | June 18, 1912 |
| 1,296,194 | La Cour | Mar. 4, 1919 |
| 1,488,531 | Cruse | Apr. 1, 1924 |
| 1,734,310 | Taylor | Nov. 5, 1929 |
| 1,903,313 | Johnson | Apr. 4, 1933 |
| 1,943,622 | Piatt | Jan. 16, 1934 |
| 1,963,358 | Foltz | June 19, 1934 |
| 1,980,424 | Morgan | Nov. 13, 1934 |
| 1,995,185 | Macchi | Mar. 19, 1935 |
| 2,145,565 | Curtis | Feb. 7, 1939 |
| 2,244,800 | Pascale | June 10, 1941 |
| 2,264,226 | Toner | Nov. 25, 1941 |

FOREIGN PATENTS

| Number | Country | Date |
|---|---|---|
| 594 | Great Britain | Jan. 14, 1888 |
| 53,258 | Norway | Nov. 6, 1933 |